United States Patent [19]

Bardin et al.

[11] 4,039,455

[45] Aug. 2, 1977

[54] RETAINING DEVICE FOR AN APPARATUS HAVING FLAT SEMI-PERMEABLE MEMBRANES

[75] Inventors: Robert Bardin, Vienne; Michel Cronenberger, Rhone, both of France

[73] Assignee: Rhone-Poulenc Industries, Paris, France

[21] Appl. No.: 577,839

[22] Filed: May 15, 1975

[30] Foreign Application Priority Data

May 16, 1974 France .............................. 74.17001
Apr. 1, 1975 France .............................. 75.10102

[51] Int. Cl.² ............................................ B01D 13/00
[52] U.S. Cl. ............................. 210/321 A; 210/321 B
[58] Field of Search ............... 23/258.5 M; 55/16, 158; 210/232, 321 R, 321 D, 321 K, 321 A, 321 B; 220/306, 307, 340, 343

[56] References Cited

U.S. PATENT DOCUMENTS

| 2,686,154 | 8/1954 | MacNeill | 210/321 |
|---|---|---|---|
| 2,717,619 | 9/1955 | Whitman | 220/306 X |
| 2,762,076 | 9/1956 | Kiba | 220/343 |
| 3,349,989 | 10/1967 | Indrike | 220/340 X |
| 3,352,421 | 11/1967 | Cary | 210/321 K X |
| 3,421,628 | 1/1969 | Barnabe et al. | 210/321 R X |
| 3,624,983 | 12/1971 | Ward | 210/321 K X |
| 3,800,510 | 4/1974 | Lamond | 55/158 |
| 3,828,969 | 8/1974 | Schurman | 220/343 X |
| 3,907,103 | 9/1975 | Shaw | 220/306 X |
| Re. 24,736 | 11/1959 | Isreeli | 210/321 |

*Primary Examiner*—Thomas G. Wyse
*Assistant Examiner*—Robert H. Spitzer
*Attorney, Agent, or Firm*—Cushman, Darby & Cushman

[57] ABSTRACT

A stack of membranes and spacers is held between upper and lower plates, the lower plate having hinged thereto, at least two side plates. These may be hinged by being formed integrally so as to be flexible outwardly, or may be hinged by suitable co-operating projections and cut-outs or by more conventional hinge-means. The upper plate is locked by co-operating projections and cut-outs on the upper plate and the top edges of the side plates. Means may be provided to enable the upper plate to be pressed downwardly to different positions to compress the stack to different degrees, these means, for example, including rack shaped surfaces on the projections and/or cut-outs.

21 Claims, 14 Drawing Figures

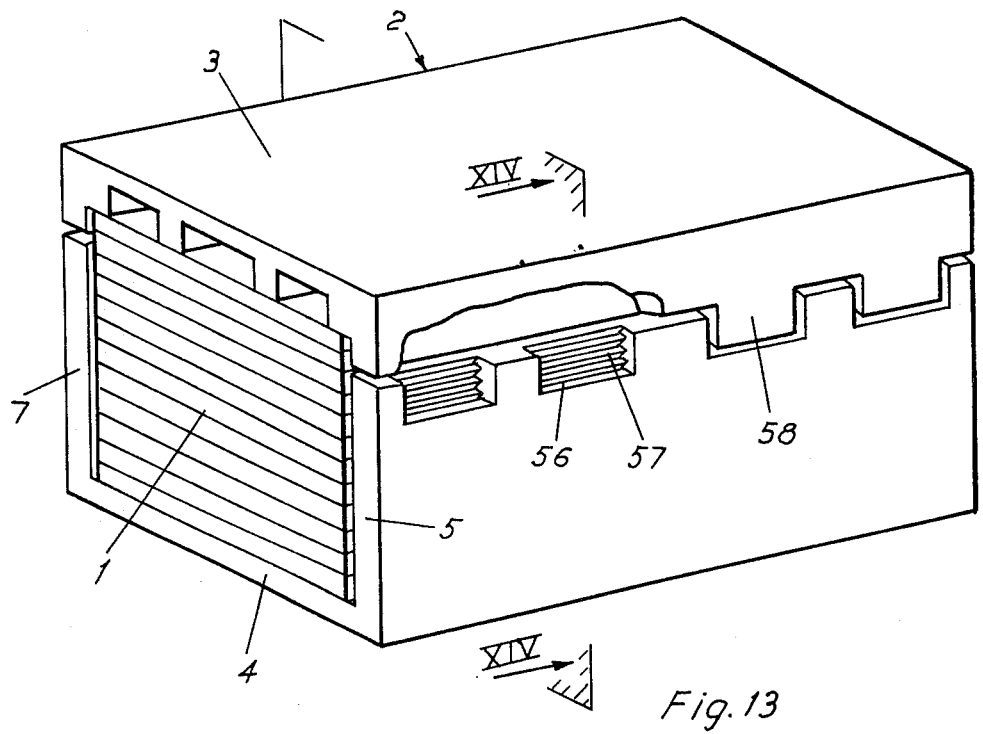
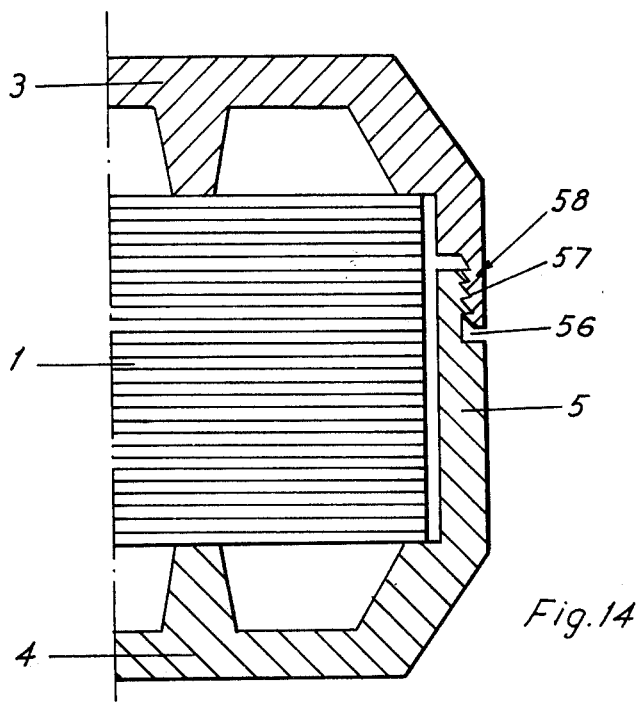

RETAINING DEVICE FOR AN APPARATUS HAVING FLAT SEMI-PERMEABLE MEMBRANES

The present invention relates to a retaining device for an apparatus having flat semi-permeable membranes, such as exchange and/or separating apparatus. The device of the invention is particularly suitable for the apparatuses used especially in the medical field as haemodialysers or as blood oxygenators.

Exchange and/or separating apparatuses having flat membranes, denoted hereafter by the general term "module", usually consist of a stack of semi-permeable membranes and spacers clamped inside a retaining device. The latter generally consists of two plates (which will be denoted hereafter by the terms "upper plate" and "lower plate" whatever the orientation of the apparatus may be in use) connected by a number of bolts or by riveted tie-rods.

These retaining devices are generally very suitable, but they are rather difficult to manufacture. The initial clamping of the devices having bolts can be put out of adjustment or changed at the time of use, and this can lead either to a defect in leakproofness or, on the other hand, to objectionable deformation of the exchange zones, as well as to excessive stresses which can cause the rupture of certain elements of the module. The riveting operations, in their turn, require specialised equipment and the presence of fillers (generally glass fibres) in the material of which the tie-rods are made can cause wear of the tools for shaping the rivet head.

According to the present invention we provide a retaining device for fluid treatment apparatus having a stack of membranes and spacers clamped between two plates, said apparatus comprising at least one side plate, a lower plate hinged to said side plate, an upper plate and means to lock said upper plate to said side plate.

In a preferred construction the apparatus comprises a stack of membranes and spacers arranged and clamped between two end plates, said apparatus comprising at least two side plates, a lower plate hinged to said side plates, an upper plate and means to lock said upper plate to said side plates.

The invention also provides fluid treatment apparatus comprising a lower plate, at least two side plates hinged to said lower plate, a stack of membranes and spacers arranged on said lower plate parallel thereto, an upper plate and means to lock said upper plate to said side plates to hold said stack against the lower plate.

Such apparatus is simple and economical to manufacture and ensures that the elements of the module are clamped in a manner which cannot easily be put out of adjustment at an inopportune moment.

In order that the invention will be more fully understood, the following description is given, by way of example only, reference being made to the accompanying drawings, in which:

FIG. 13 is a perspective view, with part broken away of a further embodiment of the device; and FIG. 14 is a fragmentary cross-section taken along the plane XIV—XIV of FIG. 13.

Should be understood that the term "stack" denotes the combination formed by superposing spacers and membranes cut-out beforehand; it can also denote the combination consisting of spacers introduced between the folds of a membrane folded, for example, in a zig-zag arrangement. The term "stack" also denotes the combination formed by folding, for example in a zig-zag arrangement, at least one membrane firmly fixed to its support.

The term "asperity" denotes the parts projecting from an uneven surface and the term "rack" denotes a surface equipped with preferably parallel notches.

Figure 1:
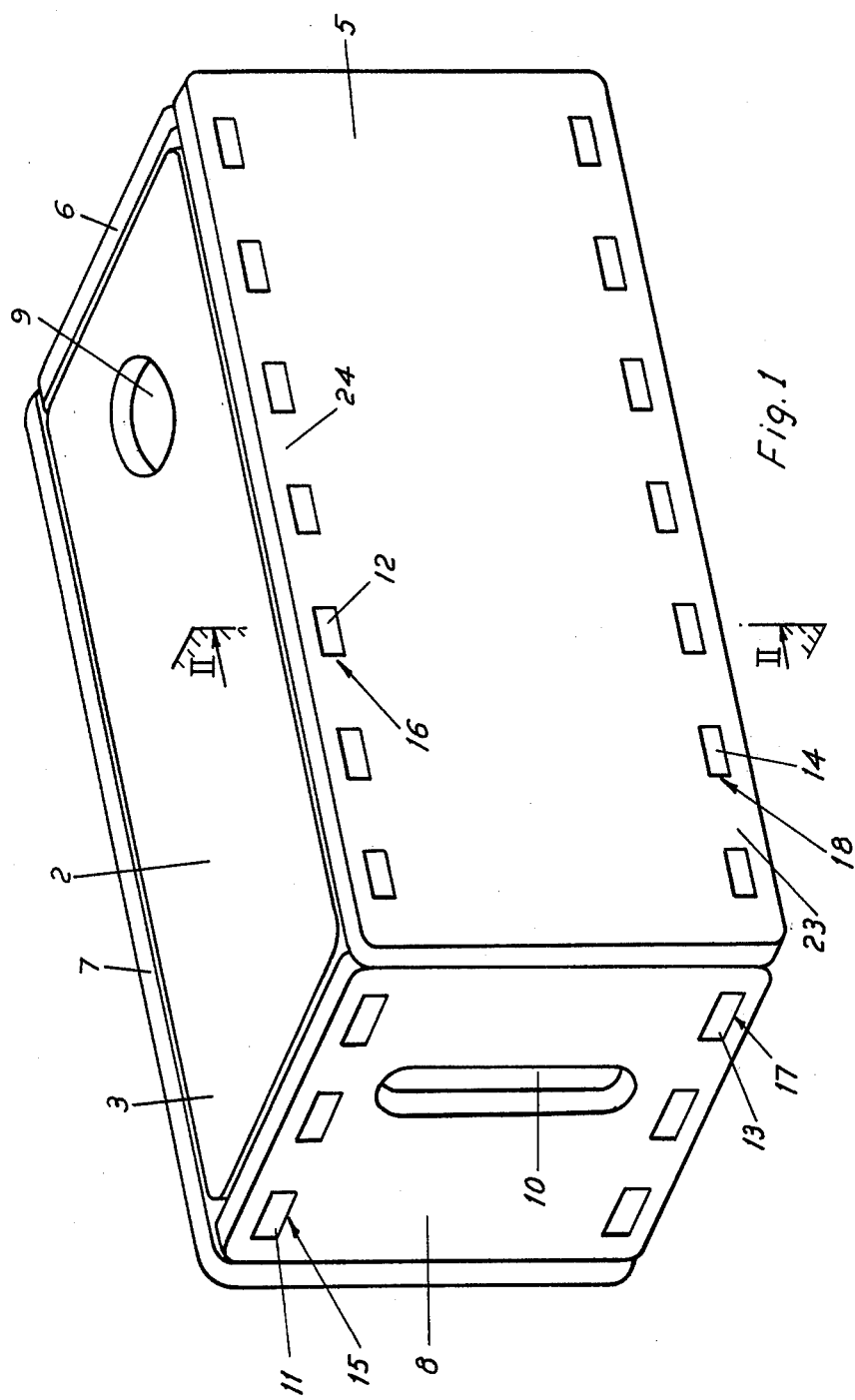
FIG. 1 is a general perspective view of one embodiment of the device according to the invention.
Figure 2:
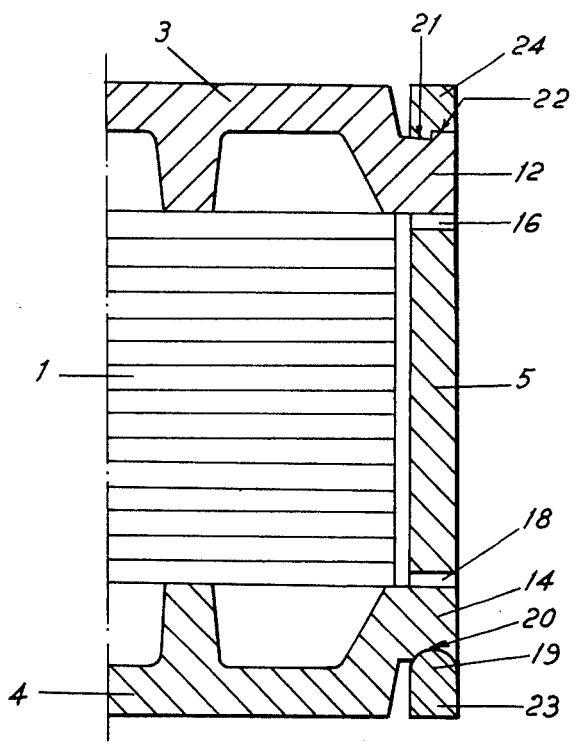
FIG. 2 is a fragmentary cross-section taken along the plane II—II of FIG. 1.

The module shown in FIGS. 1 and 2 consists of a stack 1 of membranes and spacer plates held clamped inside a retaining device 2 according to the invention.

The retaining device consists of two preferably rigid plates 3 and 4 connected by four side plates 5, 6, 7 and 8. The side plates are provided with means which enable them to be hinged to the plate 4 and with means which enable them to be locked onto the plate 3.

The number of side plates can be between 1 and 30, and is preferably between 2 and 20. The number of side plates and their dimensions will advantageously be chosen according to the dimensions of the module.

The side plates and/or the plates can advantageously have orifices 9 and 10, in order to allow pipelines to pass through which connect the module to the various circuits.

The plates 3 and 4 can be provided at their periphery with at least one projection such as 11, 12, 13, 14 and the side plates can have at least one cut-out such as 15, 16, 17, 18 which advantageously engage the projections.

Referring more particularly to FIG. 2, the combination of the projection 14, at the periphery of the plate 4 and the cut-out 18 of the side plate 5 helps to hinge the said side plate 5 to the said plate 4, whilst the combination of the projection 12 at the periphery of the plate 3 and the cut-out 16 of the side plate 5 helps to lock the side plate 5 onto the said plate 4.

The cut-out 18 of the side plate 5 advantageously has a cylindrical bead 19 on the outer edge parallel to the hinge axis of the side plate. The corresponding projection of the plate 4 carries a preferably cylindrical hollow 20 on the face opposite the bead 19. Advantageously, the diameters of the cylindrical bead and hollow are substantially the same.

Once the projections have been engaged in the corresponding cut-outs of the side plate 5, the presence of the bead and the hollow makes it possible to hinge and anchor the side plate 5 onto the plate 4. In the hinge zone 23, the cut-outs and the projections are aligned and preferably all identical.

The cut-out 16 of the side plate 5 advantageously has, on the outer edge parallel to the hinge axis of the side plate 5, and in the direction from the inside towards the outside of the module, an inclined zone 21 and an uncoupling component 22. The corresponding projection of the plate 3 also carries, on the face opposite, an inclined zone and a shoulder. The inclined zones on the one hand, and the uncoupling component and the shoulder on the other hand, are chosen so that they make it possible to lock the side plate 5 and the plate 3. Advantageously, the inclined zone and the shoulder form a hook.

In the locking zone 24, the cut-outs and the projections are preferably aligned and all identical.

The plates can optionally be provided over their entire periphery with projections, either for hinging or for locking with the side plates.

Referring to FIG. 1, the device represented consists of two rigid plates equipped on their four sides with projections; four side plates equipped with cut-outs connect the two plates whilst holding the stack clamped.

The retaining device described ensures that the stack of spacers and membranes is clamped so as to have a constant height; it is thus advantageous to use spacers of gauged thickness.

The various elements of the module can be assembled by placing the stack of spacers and membranes on the lower plate and this stack is covered by the upper plate. The combination thus formed is then placed between the jaws of a press (not shown) and a force is exerted on this combination so that its thickness becomes equal to or slightly less than the theoretical desired thickness. By a thickness slightly less than the theoretical desired thickness there is to be understood an actual thickness, between the plates under the press, equal to the theoretical thickness multiplied by a coefficient which is generally between 0.95 and 1 and is preferably between 0.99 and 1. This coefficient depends especially on the nature and the elasticity of the materials forming the spacers and the side plates, on the number of spacers and their design, as well as on the working cross-section of the side plates. The lower cut-outs of the side plates are positioned opposite the projections of the lower plate, and the bead of the side plate is then engaged in the hollow of the lower plate.

The side plates are folded back by engaging the upper cut-outs of the latter over the projection of the upper plate; the force of the press is relaxed and the module is released.

As soon as the action of the press ceases, the side plates are subjected to a tensile force which balances elastically the force resulting from the compression of the elements of the stack. The side plates then lengthen very slightly and the thickness of the module become substantially equal to the theoretical desired thickness. The result of this is that the internal cells of the stack thus assume the strict dimensions found experimentally to be necessary to permit good exchange or transfer reactions across the membranes. It has been found that these characteristics are retained for a very long time.

The following modifications are given, merely by way of example, without implying any limitation.

Figures 3, 4:
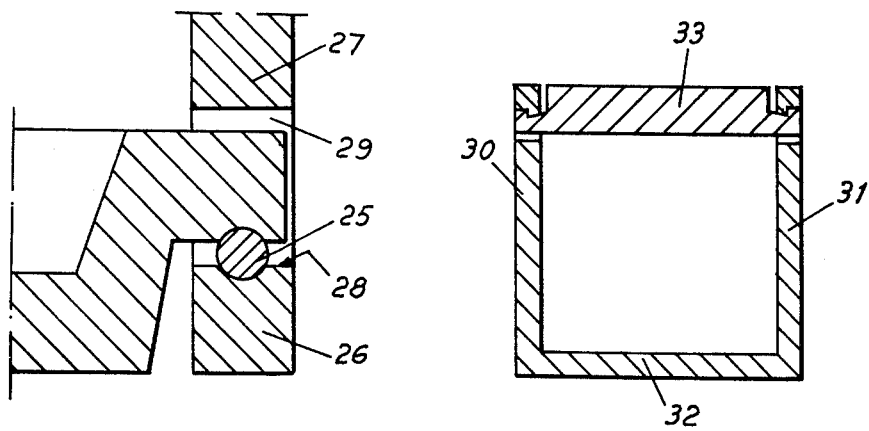
FIG. 3 is a fragmentary cross-section of a modified form of the hinge system of the device shown in FIG. 2.
FIG. 4 is a cross-section of a second embodiment of the device according to the invention.

In the construction of FIG. 3 the hinge zone 26 has the bead replaced by a rod 25 which is advantageously cylindrical. This rod is fitted into a passage provided in the thickness of the side plate 27 parallel to the hinge axis of the side plate. The passage is preferably a secant to the outer wall 28 of the cut-outs 29.

Rods 25 of different diameters can optionally be provided, and these make it possible to compensate for differences in stack height brought about by using spacers of non-gauged thickness, and thus to clamp the stack in the desired manner. The various elements of the module utilising the device of FIG. 3 can be assembled in accordance with a process similar to that used above; it suffices beforehand to introduce the rod 25 into the passage provided in the thickness of the side plate 27.

If desired at least one side plate can be firmly fixed to one of the plates. Optionally, as shown in cross-section in FIG. 4, the device can consist of two flexible side plates 30 and 31 firmly fixed to a plate 32, and the combination then forms a channel, the side plates 30 and 31 of which are the walls and the lower plate 32 of which is the base. The free end of the walls is then provided with means which enable them to be locked onto the upper plate 33. These means are advantageously identical to those shown in FIG. 2. The thickness of the walls 30 and 31 is preferably chosen so that it allows a sufficient separation to introduce the rigid plate 33 when the retaining device according to the invention is being locked.

The various elements of the module utilising the device according to this embodiment can be assembled in the following way. The stack is placed on the base of the channel formed by the side plates firmly fixed to the lower plate, and this stack is covered by the upper plate 33. The combination thus formed is placed between the jaws of a press, and a force is then exerted on this combination in order to bring it to the desired thickness, whilst keeping the walls 30 and 31 apart. The side plates are freed and they latch by engaging the upper cut-outs of the said walls on the projections of the plate 33. The force is relaxed and the module is released.

Figure 5:
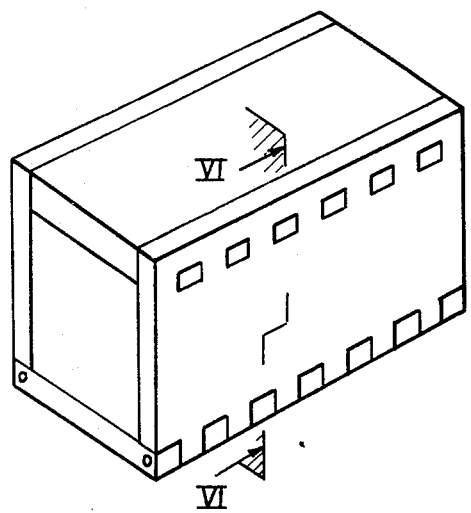
FIG. 5 is a perspective view of a third embodiment.
Figure 6:
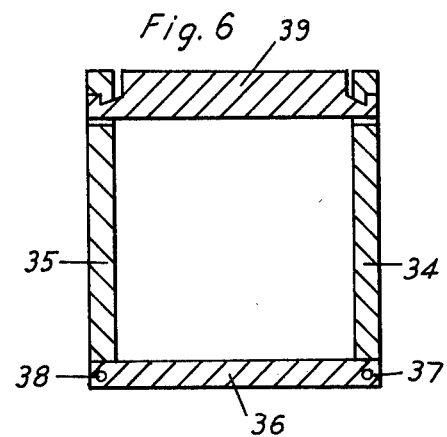
FIG. 6 is a cross-section taken along the plane VI—VI of FIG. 5.

In FIGS. 5 and 6, it is seen that the side plates 34 and 35 are hinged on the plate 36 by means of axles 37 and 38 introduced into passages provided both in the projections of the plate 36 and in the projections of the hinge zone of the side plates 34 and 35. The side plates are advantageously locked onto the plate 39 as in FIG. 2. To assemble this embodiment, the stack is placed on the lower plate and the latter is covered by the upper plate. The combination thus formed is then placed between the jaws of a press, the projections of the side plates are engaged between the projections of the lower plate, and the axles 37 and 38 are introduced into the passages provided for this purpose in the projections. A force is then exerted on the combination in order to bring it to the desired thickness, the side plates are folded back by causing them to pivot about the axles and by engaging the upper cut-outs of the latter on the projections of the upper plate, the force is relaxed and the module is released.

Figure 7:
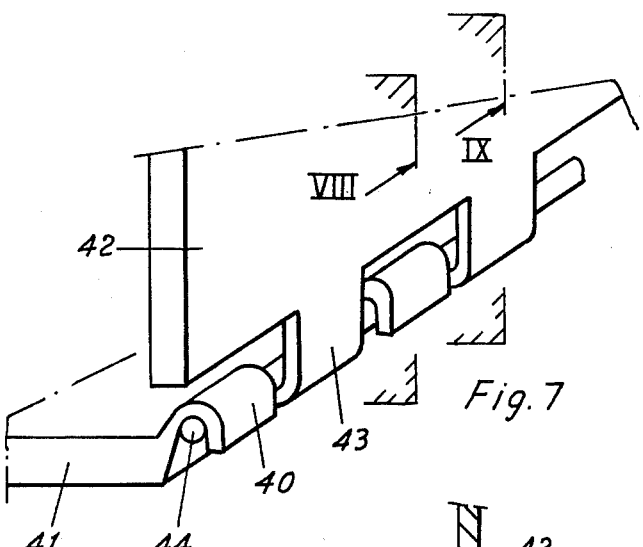
FIG. 7 is a fragmentary perspective view of another embodiment of device according to the invention.
Figures 8, 9:
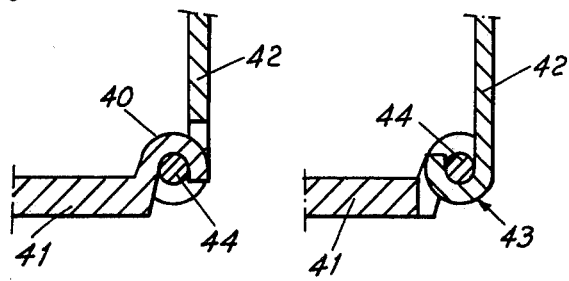
FIGS. 8 and 9 are fragmentary cross-sections taken along the planes VIII—VIII and IX—IX of FIG. 7.

In FIGS. 7, 8 and 9 the projections of the plates and of the side plates are advantageously semi-cylindrical cavities. The concave shape of the projections is oriented towards the outside of the module in the case of the projections 40 situated on the plate 41 and is oriented towards the inside of the module in the case of the projections 43 situated on the hinge zone of the side plate 42. An axle 44 provides both the connection between the side plate 42 and the plate 41, and the hinge system.

The hinge axle present in the embodiments of FIGS. 5 and 6 and FIGS. 7, 8 and 9 can optionally be locked, with respect to translational movements, by any known means such as a stop or nuts (not shown).

To assemble the construction of FIGS. 7, 8 and 9, the two plates and the stack as well as the clamping of the combination thus formed can be carried out as described above. The axle 44 is placed in the concave shape of the semi-cylinders situated on the side plate. The hinge zone of the side plate is then engaged on the lower plate in such a way that its projections become inserted between the projections of the lower plate, and the axle 44 becomes engaged in the concave shape of the projections of the lower plate. The side plates are then folded back by pivoting about the axle 44 and the cut-outs of the side plates are engaged in the projections of the upper plate.

Figure 10:
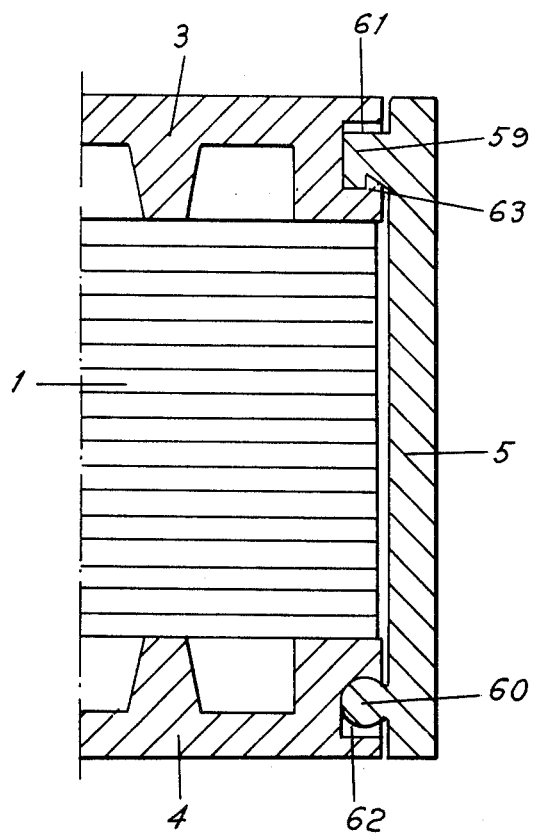
FIG. 10 is a fragmentary cross-section through a plane perpendicular to the side plates of another embodiment of the device.

In the construction of FIG. 10 the projections 59 and 60 are carried by the inner face of the side plates 5 and the openings 61 and 62 are similar to cavities carried by the plates 3 and 4. The projection 60 carried by the side plate 5 in the hinge zone is bounded by a convex cylindrical surface with an axis parallel to the plates; it extends into the opening 62 carried by the lower plate 4, and this opening is also bounded by a similar concave cylindrical surface. The combination of the projection 60 and the opening 62 helps to hinge the side plate 5 to the lower plate 4. The projection 59 carried by the side plate 5 in the locking zone is similar to the locking projections described above and extends into the cavity 61 carried by the plate 3, and this cavity has a rim 63 against which it locks.

The cylindrical surface of the projection which allows hinging to be effected can be replaced by a spherical surface, and the hinging of the side plate 5 to the plate 4 is then similar to a ball and socket joint.

The various elements of the module utilising the device of FIG. 10 can be assembled in a manner similar to that of the module utilising the device represented in FIGS. 1 and 2.

Retaining devices according to the invention can also optionally be produced which make it possible to ensure that the stack of spacer plates and membranes is clamped in such a way that the compressive force between the various elements of the stack is kept at a predetermined value. Such devices are described below.

Figure 11:
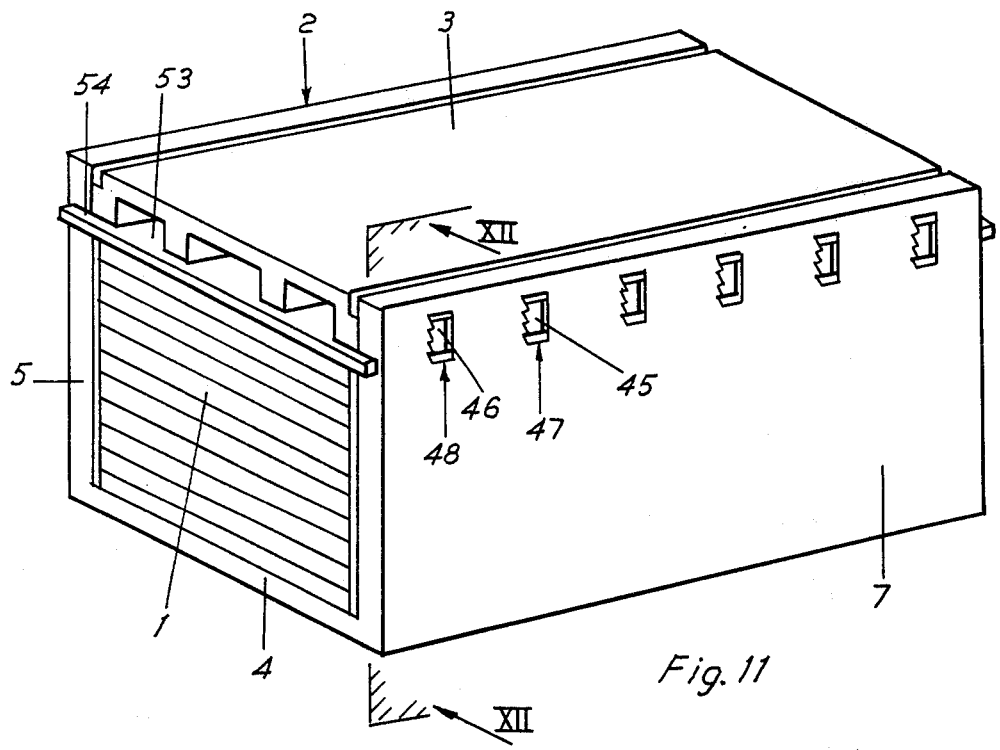
FIG. 11 is a perspective view of a further embodiment of the device.

The retaining device 2 shown in FIG. 11 consists of two plates 3 and 4 connected by two side plates 5 and 7 firmly fixed to one of the plates. At their free end, the side plates are provided with means which enable them to be locked onto the other plate.

The upper plate 3 is formed with at least one projection 45, 46 and the side plates have at least one cut-out 47, 48. The combimations formed by the projections and the corresponding cut-outs help to lock the side plate onto the upper plate.

Figure 12:
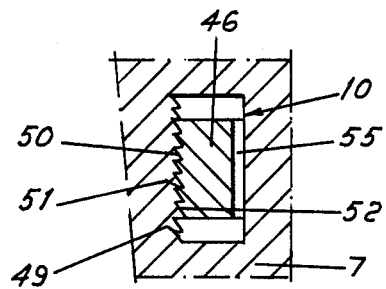
FIG. 12 is a cross-section through the plane XII—XII of a projection/cut-out of the device of FIG. 11.

Referring more particularly to FIG. 12, it is seen that the projection 46 and the cut-out 48 have the general shape of rectangles, the sides of which are respectively parallel and perpendicular to the plates. The side 49 of the ractangle representing the cut-out 48 and the side 50 of the rectangle representing the projections 46 are substantially perpendicular to the plates 3 and 4, and the sides 49 and 50 represent, on the cross-sectional plane XII—XII, two faces respectively of the cut-out 48 and to the projection 46. Advantageously, the length of the side 50 is less than that of the side 49 to enable the projection to be moved within the cut-out, perpendicularly to the plates 3 and 4.

The faces of the projection and of the cut-out which are in contact can be glued. Advantageously, they carry asperities, and these faces can be, for example, milled, ribbed, crackled, grained, indented, grooved, toothed or corrugated. The faces of the projections and of the cut-outs which are opposite one another preferably have notches in the form of a rack. The faces 51 of the notches are preferably parallel to the plate 3 and the faces 52 inclined from the upper plate towards the lower plate. Advantageously the rack can be provided with ratchet notches, that is to say with notches such as the faces like (51) which are inclined from the upper plate towards the lower plate.

The asymmetric notches permit the movement of the projections perpendicularly to the plates 3 and 4 and of the plate 3 towards the plate 4, and oppose movement in the opposite direction. Thus the asymmetric notches allow the stack to be clamped by means of the plates and oppose it being unclamped. Moreover, the ratchet notches oppose any release due to a horizontal movement of the racks of the projections and the cut-outs.

The end plate 53 of a stack held clamped in a retaining device as shown in FIG. 11 is preferably prevented from effecting a lateral movement by any known means, for example by lugs 54.

The cut-outs and the projections can have any simple geometric shape. They can have one face perpendicular to the plates, that is to say perpendicular to the plane of the spacers and the membranes, and they are preferably in contact over this face. The projections are, however, of a size such that they can shift inside the cut-outs, their respective and corresponding faces equipped with notches remaining in contact.

The projections and the cut-outs can optionally have two faces which are perpendicular to the plates 3 and 4 and which are equipped with asperities; advantageously, the cut-outs have the shape of a U open towards the outer face of the upper plate.

The cut-outs can optionally consist of recesses substantially perpendicular to the plates, entirely contained within the thickness of the side plate and open towards the outer face of the upper plate. The projections which engage therewith are then similar to studs substantially perpendicular to the plates, preferably situated on the lower face of the upper plate. It is to be understood that the studs and the recesses have a cross-section of simple geometric shape, and their respective side surfaces are preferably equipped with asperities and preferably have at least one point of contact between them.

Referring to FIG. 11, the corresponding faces of the projections and of the cut-outs of the device represented are provided with notches forming a rack. These notches have their solid angles of intersection parallel to the plates 3 and 4 and perpendicular to the side face of the stack in front of which they are situated.

The various elements of the module can be assembled in the following way. The stack of plates and membranes is placed on the lower plate firmly fixed to the side plates; this stack is covered by the upper plates and the projections are engaged in the cut-outs.

The combination thus formed is then placed between the jaws of a press (not shown) and a force is exerted on this combination so that its thickness becomes equal to or slightly less than the theoretical desired thickness. The upper plate 3 is then made to effect a slight movement relative to the combination consisting of the lower plate, the stack and the side plates in order to bring the notches carried by the projections into the spaces situated between the notches carried by the cut-outs.

The upper plate 3 slips over the end plate 53, and the stack of membranes and spacer plates consequently does not run the risk of being moved. The force of the press is relaxed, and the asymmetry of the notches prevents the faces which are opposite one another of the cut-outs and of the projections from effecting any translational movement relative to one another, which would tend to unclamp the stack. The module which remains locked in this way is then removed from the press.

It is optionally possible to slip a small wedge into the free space 55 in FIG. 12, situated between a projection and a cut-out, before relaxing the force. This wedge then prevents any movement of the plate 3 relative to the side plates. It is also optionally possible to slip at least one pin into a recess which is substantially perpendicular to the upper plate and which is situated both in the latter and in at least one of the side plates.

In the embodiment of FIGS. 13 and 14 the retaining device comprises two plates 3 and 4 connected by two side plates 5 and 7 firmly fixed to one of the plates. At their free end the side plates carry cut-outs such as 6 equipped with elongated notches 57 substantially parallel to the plates 3 and 4 and to the side face of the stack in front of which they are situated. Projections 58 carried by the upper plate 3 advantageously correspond to the cut-outs 56 carried by the side walls 5 and 7, and the projections are also formed on their inner face with notches which correspond to the notches carried by the cut-outs. These notches are also advantageously ratchet notches.

The side plates can optionally have a single cut-out provided with elongated notches, and the length of the cut-out is then preferably between 50 and 100% of the dimension of the side plate taken parallel to the plates. Of course, in this case, the upper plate carries a projection corresponding to the cut-out.

The various elements of the module utilising the device according to this embodiment can be assembled in a manner similar to that described above. The force exerted on the stack via the plates causes the locking of the cut-outs and the projections. In fact, the notches carried by the projections firmly fixed to the plate 3 become caught on the notches carried by the cut-outs of the side walls 5 and 7; the presence of several notches enables the retaining device to be adjusted to the desired theoretical height. The force is then relaxed and the module thus produced, which remains locked due to the elasticity of the side walls, is released from the press. The locking means can optionally comprise a single surface provided with asperities, this surface being situated either on the cut-out or on the projection, the corresponding surface of the projection or of the cut-out being then devoid of apparent asperities. Since the combination of the friction forces between these two surfaces is at any instant greater than the resultant of the compressive force being exerted on the projection/cut-out combinations of the stack, the latter is held clamped.

The invention is in no way limited to the diverse embodiments of the device and to the variants described above, and of course, it would not go outside the scope of the invention to combine two or more embodiments or variants with one another.

The plates and the side plates can be made from materials which may or may not be different and which may or may not be homogeneous; in particular, they can be reinforced, for example by a metal frame. They can contain metal elements (for example made of aluminium alloy or steel) or elements made of thermoplastic materials such as polyolefines, polyamides, acrylic resins, polystyrene and their mixtures or copolymers which have especially good mechanical characteristics, and in particular good flexural and tensile strengths. Thermoplastic materials to which reinforcing fillers (especially asbestos, carbon and preferably glass fibres) have been added are preferably employed.

The side plates can optionally be made from a semi-resilient material and, in this case, after having engaged the hinge zones of the side plates on the projections of the lower plate, the side plate is stretched until it is possible to engage the cut-outs of the side plates on the projections of the upper plate and thus lock the module.

The module thus formed can be of the exchange type; that is to say, it can contain compartments which permit two liquid or gaseous fluids to flow on either side of a membrane. It can also be of the separating type; that is to say, it can contain compartments which allow a fluid to flow, and, separated from them by a membrane, other compartments which allow a component of this fluid to be collected and removed. The internal arrangements of the elements of the stack can be of any known type. There can be any number whatsoever of spacers and the nature of the materials of which they are formed can be diverse.

The compartments can be supplied either in series or in parallel or by any combination whatsoever of a series-parallel arrangement. The pipelines for introducing or removing the fluids, connecting the module to the zone outside, can consist of manifolds arranged perpendicularly to the stack and can pass through the sheets of the retaining device via suitable orifices. They can also be, and preferably are, arranged laterally, parallel to the elements of the stack. In the latter case, they are connected to an external pipe via a manifold through an orifice in a side plate, and the said manifold has no connections with the retaining device.

The retaining device according to the invention prevents any subsequent change in the initial clamping of the stack of spacers and membranes. This clamping must thus be sufficiently well adjusted so that leakproofness of the module is achieved from the start and is retained, so that the thickness of the compartments is and remains suitably gauged, and so that the elements of the module are subject to only moderate stresses.

The retaining devices according to the invention, the locking means of which comprise at least one surface equipped with asperities, has the advantage of making it possible to adjust the compressive force between the various elements forming the stack to the predetermined value necessary to achieve leakproofness of the module, so that the thickness of the compartments is suitably gauged and so that the elements of the module are subject to only moderate stresses and do not present the danger of tearing the membranes.

The retaining device which is the subject of the invention can optionally be dismantled and re-used. In fact, it is possible to reclamp the stack, by means of a press, until the asperities, for example the notches of the racks, can be freed easily. It is then possible to recover the spacers and the retaining devices of a module which is not leakproof or which has been used, for the purpose of re-using it.

The module can be assembled, tested, sealed and optionally sterilised in the factory, so that it can be delivered ready for use, for example in a sterile packaging. This simple and economical retaining device is suitable for mass production and for being stored for a long period, and makes it possible to provide apparatuses of constant quality which are not subject to being put out of adjustment at inopportune moments. Modules which are only to be used once can be constructed without any metal parts; they can thus be destroyed easily after use, particularly by incineration.

We claim:

1. Fluid treatment apparatus comprising:
a lower plate,
a stack of membranes and spacers arranged on said lower plate parallel thereto,
at least two side-plates connected to said lower plate, effective to permit movement of said side plates with respect to said lower plate,
an upper plate adjacent said stack, and
co-operating locking means on said upper plate and said side plates which lock said upper plates to said side plates and which compress said stack against the lower plate whereby the membranes and spacers forming said stack are compressed together a predetermined compressed thickness against the lower plate.

2. Apparatus as claimed in claim 1, wherein said side plates are flexible and firmly fixed to the lower plate, and said locking means are provided at the free end of each said side plate.

3. Apparatus as claimed in claim 1 and further comprising hinge means connecting said side plates to said lower plate.

4. Apparatus as claimed in claim 3, wherein the hinge means each comprise an axle.

5. Apparatus as claimed in claim 3, wherein the locking means comprise at least one projection at the periphery of one of the plates and at least one co-operating cut-out in the adjacent side plate.

6. Apparatus as claimed in claim 5, wherein the locking means on the upper plate comprise, from the centre to the periphery, an inclined zone and an uncoupling component followed by a raised shoulder on which the corresponding surfaces of the cut-outs of the side plate become engaged.

7. Apparatus as claimed in claim 3 wherein the hinge means comprise at least one projection at the periphery of the lower plate and at least one co-operating cut-out in the adjacent side plate.

8. Apparatus as claimed in claim 7, wherein the hinge means comprises at least one projection on the lower plate and the projection carries a cylindrical surface and the cut-out carries a co-operating cylindrical surface engageable therewith.

9. Apparatus as claimed in claim 7, wherein the hinge means comprises at least one projection on the lower plate and the said projection carries at least one spherical surface and the cut-out of the side plate carries a co-operating spherical surface engageable therewith.

10. Apparatus as claimed in claim 3, wherein the locking means comprise at least one projection carried by each said side plate and at least one co-operating cavity at the periphery of the upper plate.

11. Apparatus as claimed in claim 10, wherein the locking means on the side plate comprise, in the direction from the outside of the appartus towards the inside of the apparatus, an inclined zone followed by a shoulder on which a corresponding surface of the cavity of the upper plate can be engaged.

12. Apparatus as claimed in claim 3, wherein the hinge means comprise at least one projection carried by the side plate and at least one co-operating cavity at the periphery of the lower plate.

13. Apparatus as claimed in claim 1 comprising between 1 and 30 side plates.

14. Apparatus as claimed in claim 1, wherein the locking means comprise at least one surface, the general orientation of which is parallel to the side wall, the said surface being provided with asperities effective to adjust the compressive force between the various elements forming the stack to a predetermined value and for keeping it at this value.

15. Apparatus as claimed in claim 14, wherein the surface is provided with a rack.

16. Apparatus as claimed in claim 15, wherein the solid angles of interception of the notches of the rack are parallel to the planes of the membranes of the stack.

17. Apparatus as claimed in claim 15, wherein the solid angles of intersection of the notches of the rack are parallel to the side face of the stack in front of which they are situated.

18. Apparatus as claimed in claim 15, wherein the solid angles of intersection of the notches of the rack are perpendicular to the side face of the stack in front of which they are situated.

19. A method of making fluid treatment apparatus comprising forming a stack of membranes and spacers, positioning this stack on a lower plate to which are connected at least two side plates having cut-outs adjacent their upper edge, placing an upper plate on the stack, the upper plate having projections adapted to co-operate with the cut-outs of the side-plates, clamping the thus formed assembly thus causing the stack to be compressed and then engaging the cut-outs on the projections of the upper plates, relaxing the clamping force and releasing the thus formed assembly whereby the membranes and spacers forming said stack are compressed together a predetermined compressed thickness against the lower plate.

20. A method of making fluid treatment apparatus comprising forming a stack of membranes and spacers, positioning the stack on the lower plate of a channel section member having side plates with cut-outs adjacent their upper edge, placing an upper plate on the stack, said upper plate having projections co-operable with said cut-outs, clamping the assembly whilst keeping the side plates apart, releasing the side plates so that the cut-outs thereof engage on the projections of the upper plate, relaxing the clamping force and releasing the thus formed assembly whereby the membranes and spacers forming said stack are compressed together a predetermined compressed thickness against the lower plate.

21. A method of making fluid treatment apparatus comprising forming a stack of membranes and spacer plates, positioning this stack on a lower plate provided with projections having openings therein, positioning side plates having projections with openings therein aligned with the openings of the projections of the lower plate, placing an upper plate on the stack, clamping the thus formed assembly, introducing axles into the openings in the projections, to form hinges between the side plates and the lower plate, folding back the side plates so that the upper cut-outs therein engage projections on the upper plate, relaxing the clamping force and releasing the thus formed assembly whereby the membranes and spacer plates forming said stack are compressed together a predetermined compressed thickness against the lower plate.

* * * * *